(12) United States Patent
Naderi

(10) Patent No.: US 10,294,114 B2
(45) Date of Patent: May 21, 2019

(54) AMMONIA CONVERTER COMPRISING A TUBULAR INNER WALL

(71) Applicant: Abdol Hossein Naderi, Sevres Anxaumont (FR)

(72) Inventor: Abdol Hossein Naderi, Sevres Anxaumont (FR)

( * ) Notice: Subject to any disclaimer, the term of this patent is extended or adjusted under 35 U.S.C. 154(b) by 71 days.

(21) Appl. No.: 15/108,437

(22) PCT Filed: Dec. 23, 2014

(86) PCT No.: PCT/IB2014/002870
§ 371 (c)(1),
(2) Date: Jun. 27, 2016

(87) PCT Pub. No.: WO2015/097538
PCT Pub. Date: Jul. 2, 2015

(65) Prior Publication Data
US 2016/0326005 A1 Nov. 10, 2016

(30) Foreign Application Priority Data
Dec. 26, 2013 (FR) ..................................... 13 03138

(51) Int. Cl.
*B01J 8/00* (2006.01)
*B01J 8/02* (2006.01)
(Continued)

(52) U.S. Cl.
CPC ........... *C01C 1/0417* (2013.01); *B01J 8/0214* (2013.01); *B01J 19/248* (2013.01);
(Continued)

(58) Field of Classification Search
CPC ... B01J 8/00; B01J 8/02–8/0214; B01J 19/00; B01J 19/24; B01J 19/2415;
(Continued)

(56) References Cited

U.S. PATENT DOCUMENTS 2,646,391 A * 7/1953 Houdry .................. B01J 8/0415
208/146
4,372,920 A * 2/1983 Zardi ..................... B01J 8/0005
422/148

(Continued)

FOREIGN PATENT DOCUMENTS

DE 21 66 659 A1 1/1975
EP 0 376 000 A1 7/1990

OTHER PUBLICATIONS

May 6, 2015 Search Report issued in International Patent Application No. PCT/IB2014/002870.

*Primary Examiner* — Natasha E Young
(74) *Attorney, Agent, or Firm* — Oliff PLC

(57) ABSTRACT

A vertical ammonia converter with radial flow catalyst beds includes a recipient having an outer shell equipped with a dual duct inner tubular wall to route effluents in upward and downward directions, the tubular wall made of vertical tubes with gastight walls arranged in a circle on an outer periphery of an inner wall of the shell, open at their ends to route effluent to be treated in the upward direction from an injection chamber in a lower part of the shell to a distribution chamber in an upper part of the shell, which tubes are contiguous to a filtering media over a height of a catalyst bed, the filtering media open at an upper end to pass a downward-flowing effluent and closed at a lower end to route and distribute the effluent through their effluent-permeable face towards the catalyst bed retained on an outer face by the filtering media.

18 Claims, 6 Drawing Sheets

(51) Int. Cl.
*B01J 19/00* (2006.01)
*B01J 19/24* (2006.01)
*C01C 1/04* (2006.01)

(52) U.S. Cl.
CPC ......... *B01J 19/2415* (2013.01); *C01C 1/0411* (2013.01); *C01C 1/0423* (2013.01); *B01J 2219/00081* (2013.01); *B01J 2219/2401* (2013.01); *B01J 2219/2409* (2013.01); *Y02P 20/52* (2015.11)

(58) Field of Classification Search
CPC .................. B01J 19/248; B01J 2219/24; B01J 2219/2401; B01J 2219/2402; B01J 2219/2409; C01C 1/00; C01C 1/02; C01C 1/04; C01C 1/0405; C01C 1/041; C01C 1/0417; C01C 1/042
See application file for complete search history.

(56) References Cited

U.S. PATENT DOCUMENTS 4,971,771 A 11/1990 Stahl
7,226,568 B1 6/2007 Ham et al.

\* cited by examiner

AMMONIA CONVERTER COMPRISING A TUBULAR INNER WALL

This application is a U.S. national stage application of International Patent Application No. PCT/IB2014/002870, now WO 2015/097538, filed on Dec. 23, 2014, which claims priority to French Patent Application No. FR 13/03138, filed on Dec. 26, 2013, which is hereby expressly incorporated by reference in its entirety.

This invention concerns the field of ammonia synthesis reactors also called ammonia converters, which comprise catalytic reactors that convert a gas mixture (of nitrogen and hydrogen) into ammonia under the effect of catalysts. It more particularly concerns the internal components of vertical synthesis reactors.

Typically, an ammonia converter is a reactor that comprises a recipient with an external vessel that forms the shell of the recipient and an internal cylinder, placed concentrically inside the external vessel with respect to the longitudinal central axis of the reactor such that there is a space between the external vessel and the internal cylinder for the circulation of gases. Such converter can comprise several catalyst beds operating at different temperatures and spaced apart in the internal cylinder. Catalytic reactions take place at high temperatures and under high pressure.

In the case of a vertical ammonia converter, a gas mixture of nitrogen and hydrogen is injected into the lower part of a vertical recipient and flows upwards in the space between the external vessel and internal cylinder until it reaches the upper part of the recipient where it is distributed in the internal cylinder after passing through a tubular heat exchanger, and into a first upper catalyst bed (located at the top of the vertical recipient). The gas mixture can enter by other ducts which can be central and placed at the bottom and top of the recipient, in order to have better control of the temperature of the catalytic reactions and gases. The gas mixture passes through the first bed radially to react with the catalyst particles in the bed, converting it into ammonia, then the outgoing gas effluent is directed towards a second catalyst bed, placed in the catalyst zone of said upper catalyst bed, which is at a slightly lower temperature than that of the first bed. The effluent passes through the new catalyst bed radially to react with the catalyst of said bed, then once again, the outgoing gas flow is directed towards any other intermediate catalyst beds until it reaches and passes through the last catalyst bed, located at the top of the vertical recipient. This process is known in itself.

The gas effluent to be converted therefore passes radially through several catalyst beds and is gradually converted into ammonia gas, which is then carried to the reactor outlet which is usually located at the bottom of the recipient. The ammonia is then cooled so it can be stored in liquid form or used on site.

Certain converters however may have a single catalyst bed.

Each catalyst bed is placed in the internal cylinder between two filtering media whose purpose is to retain the catalyst particles while letting the gas through. The filtering media usually comprise a gas-permeable screen whose mesh size is calibrated to retain the catalyst particles, associated with a perforated plate to ensure homogeneous distribution of the gas effluent. Like most reactor vessels, they are cylindrical in shape. The filtering media are concentric with respect to the vertical central axis of the recipient, while the catalyst beds are annular and arranged around said central axis. The first filtering media, called the outer filtering media, is located next to the inner wall of the internal cylinder of the reactor, and the second filtering media, called the inner filtering media, is located in the central zone of the reactor.

The inside space at the centre of the reactor is designed so that downward-flowing gases can circulate.

A disadvantage of this type of converter is the presence of both an external vessel and an internal cylinder, particularly since they are both thick. The external vessel is thicker, but even without the other internal components, the internal cylinder can weigh several dozen tonnes alone, in the order of 50 to 80 tonnes, for example. Their heavy weight means that fastidious handling is required for the construction of this type of converter.

Another disadvantage of these converters is the problem of installing the internal cylinder and the other internal components. The internal cylinder is usually made by the manufacturer that supplies the filtering media and, due to the complexity of the different internal components of said internal cylinder, all the internal components must be installed in the manufacturer's facility, including the catalyst beds because they cannot be accessed independently (the upper bed must be dismounted to access the lower beds). The complete internal cylinder therefore represents a very heavy weight of up to 150 tonnes, or more, and can be 40 meters high. The internal cylinder, equipped with said internal components, is therefore installed inside the reactor on-site, with the vertical external vessel already being more than 50 meters high. Installation therefore requires extremely costly handling equipment.

The external vessel and internal cylinder are made of a special metal which must be able to withstand very high temperatures and pressure, and be resistant to internal corrosion, especially to the corrosive power of hydrogen at high temperature. The external vessel and internal cylinder are therefore both heavy and expensive.

The purpose of the invention is to provide an ammonia converter for both upward-flowing and downward-flowing effluents that is light and easy to construct.

For this purpose, the invention proposes to eliminate the internal cylinder and the cylindrical outer filtering media of an ammonia converter and use a special tubular system with filtering zones that forms a dual duct tubular inner wall, arranged around the outer periphery of the inner wall of the external vessel and forming the single shell of the converter recipient. The tubular part which is placed against the inner wall of the shell forms gastight ducts which route the upward-flowing gas effluent from the bottom of the reactor towards the top. The catalyst particle filtering zones are formed by filtering media located on the front of said gas ducts and form ducts which enable a downward-flowing effluent to be distributed and directed into a given catalyst bed. The filtering media in said filtering zones are therefore in contact with the catalyst particles of the given catalyst bed, on the outside of said bed. More specifically, for a given catalyst bed, the catalyst particles are retained between the filtering media of said tubular wall present in the catalyst zone, and an inner filtering media centred on the longitudinal central axis of the recipient. The downward-flowing gas effluent in the existing spaces between the filtering media of the tubular wall and the gastight ducts, passes through said filtering media then passes radially through the thickness of the catalyst bed and leaves the bed via the inner filtering media.

The invention thus provides a vertical radial flow catalytic ammonia converter, comprising a recipient consisting of an outer shell equipped with a dual duct inner tubular wall to route effluents in the upward and downward directions, said tubular wall being made of a multitude of vertical tubular elements arranged in a circle on the outer periphery of the inner wall of said outer shell, said tubular elements being made of gastight tubes, open at the top and bottom to route an effluent to be treated from an injection chamber located in the lower part of said outer shell up towards a distribution chamber located in the upper part of said outer shell, which tubes are contiguous to the filtering media over the height of a catalyst bed, the filtering media being closed at the lower end to route and distribute a downward-flowing effluent into the catalyst bed concerned. Said filtering media retain the catalyst particles on the outer face of the catalyst bed concerned. Each filtering media is open at its top end to enable a downward-flowing effluent to enter when the lower end is closed such that said effluent will be distributed radially towards the catalyst bed through its gas-permeable face which is in contact with said catalyst bed. Said effluent-permeable face prevents the catalyst particles from passing into the space between the gastight tube and said tubular element filtering media.

A catalytic ammonia converter can contain a single catalyst bed or several catalyst beds.

More specifically, when the converter according to the invention has several catalyst beds, the invention proposes an ammonia converter whose recipient has an outer shell and comprises a dual duct inner tubular wall to route gas effluents in the upward and downward directions, said tubular wall being made of numerous longitudinal tubular elements arranged around the periphery of the inner wall of the shell, comprising tubes and filtering media. Said tubes are in the form of gastight tube sections, assembled vertically with respect to each other such that they remain gastight, each section having roughly the same height as the catalyst zone, each section being equipped, on its front face, that is, the side opposite the inside of the shell, with a filtering media contiguous to a catalyst bed over its entire height, said filtering media being closed at one end, which is its lower end in a vertical converter, and being open at the other (upper) end.

The tubes of the tubular elements are gastight. The tube sections are assembled to each other by gastight connections to form a tube whose top and bottom ends are open, the bottom end being located at the bottom of the lower catalyst bed, connected to the lower gas injection chamber, and the top end coming out above the upper catalyst bed, in an upper gas injection chamber.

The tube sections are shaped to correspond to the shape of the inner wall of the shell, which is generally of circular section, the shell being cylindrical in shape. The side of the tube section which is against the inner wall of the outer shell (i.e. the back of the tube section) has a lower radius of curvature which corresponds to the radius of curvature of the wall of said shell. Preferably, the front of the tube section is convex, with the convexity being directed towards the inside of the recipient. Preferably, each tube section has an approximately semi-cylindrical, half-moon shape. Preferably, the filtering media contiguous to it is crescent-shaped.

The filtering media fixed to each tube section is contiguous to the front of the tube section via its longitudinal edges. Said filtering media is convex, with its convexity facing towards the inside of the recipient, which creates a space between the wall of the tube section supporting it and the wall of the media, such that a fluid can enter. Said filtering media is generally made of a screen associated with a perforated plate which enables the distribution of the effluent into the catalyst bed to be controlled. The screen is placed directly in contact with the particles of the catalyst bed concerned so that it will retain said particles. Preferably, the screen is a strainer typically made of V-shaped metal wires fusion welded to V-shaped metal bars. The space between the wires is less than the size of the catalyst particles such that said catalyst particles will be retained. This type of strainer has high mechanical resistance.

The tubular wall is mounted such that it passes through the successive catalyst zones, with the height of a catalyst bed determining the height of the filtering media of the respective part of the tubular wall of the catalyst zone. A gastight connection area is provided between the tubular element section in a given catalyst zone and the next section of the adjacent catalyst zone.

According to a preferred embodiment of the invention, each catalyst zone is supported by a circular support plate with a hole in the centre to let the central elements of the converter pass through, particularly, the converter's central ducts. The plate also supports the annular catalyst bed and the respective part of the inner tubular wall of said zone. Preferably the outer edge of the support plate is fixed to the inner wall of the outer shell. Preferably according to the invention, each tube section equipped with its filtering media is fixed in a slot made in a flat whose solid part obstructs the lower end of said filtering media. The flat takes up its position on the periphery of said catalyst zone support plate. For a given catalyst zone, the flats are mounted one next to the other to form a circle around the periphery of the support plate of said zone.

Preferably, the tube sections are placed so as to be equidistant for a given catalyst zone.

Preferably according to the invention, the converter comprises an injection chamber located in the lower part of the outer shell which has a perforated dome to allow homogeneous distribution of the injected fluid and help to support the catalyst zone above it.

Preferably also, according to the invention, the converter comprises a distribution chamber located in the upper part of the outer shell having an upper concentric cone with respect to the centre of the shell, supporting the head closing flange and a distributor for the fluid to be treated introduced and preheated by an inlet at the head of the recipient during start-up of the process. Said preheated fluid makes it easier to start the catalytic reaction.

For better control of heat exchanges, a thermal insulation layer can be installed between the front wall of the tube sections opposite the filtering media and/or between two successive tubular elements. If the temperature of the wall of the recipient shell needs to be reduced, an insulation layer can be installed between the tubular elements and the inner wall of said shell.

According to the operating principle of an ammonia converter made according to the invention, the gas mixture to be converted (nitrogen-hydrogen) injected into the injection chamber in the lower part of the recipient, flows upwards through the gastight tubes of the inner tubular wall until it reaches the distribution zone located above the highest catalyst bed, then is directed downwards through a heat exchanger to the upper catalyst bed. The gas effluent leaving said catalyst bed is directed towards the next catalyst bed located below and so on. At each catalyst bed, the downward-flowing gas effluent passes through the filtering media contiguous to the tube section of the catalyst zone considered, then passes radially through the catalyst bed where it reacts with the catalyst particles to be converted, at least partially, into ammonia, the outgoing flow passing through the inner filtering media.

The operating principle of an ammonia converter according to the invention will be set out in greater detail when describing the appended figures.

Preferably, according to the invention, the inner filtering media in a given catalyst zone consists of a screen that retains the catalyst particles, associated with a perforated sheet to ensure homogeneous distribution of the gas effluent leaving the catalyst bed. Furthermore, said inner filtering media is generally associated with a deflector which directs the gas flow leaving said inner filtering media towards the central part of the recipient, particularly towards the top of a central heat exchanger when such exchanger exists. Such deflector typically comprises an unperforated cylindrical pipe, open at the top and closed at the bottom, placed around the longitudinal central axis of the recipient, which collects the gas flow leaving the catalyst bed through the inner filtering media and directs it towards the central space of the recipient.

Alternatively and advantageously, the invention proposes, once again with the purpose of making the converter lighter, to combine the inner filtering media with a new deflector installed inside said filtering media, such deflector having longitudinal grooves to route the gas effluent towards the inside of the recipient as it leaves the inner filtering media. Such deflector is in the form of a fluted sheet having a closed configuration, the perforated sheet of the inner filtering media being placed between said fluted sheet and the screen of said inner filtering media. Said perforated plate ensures uniform distribution of the outgoing gas flow over the entire height of the catalyst bed. The longitudinal grooves of said fluted sheet are each delimited by two consecutive folds of the fluted sheet.

For each catalyst zone, the top and bottom ends of the assembly formed by said deflector and the inner filtering media are gastight, except for openings at the top of each groove to enable the gas flow which has just passed through the inner filtering media to pass into the centre of the recipient, particularly towards the upper part of a central heat exchanger, when it exists. Said openings are made by cutting the upper part of the fluted sheet. Preferably, the top and bottom ends of the assembly are each closed by a flat ring, particularly by welding. in the case of the lower catalyst bed, the last bed through which the gas flow passes, and since the gas flow does not need to be directed towards a lower catalyst bed, the converted gas flow (ammonia gas) can be left to flow into the grooves at the bottom of the recipient, which means that either the top end only of the assembly formed by the deflector and the filtering media is obstructed or that no deflector is installed with the inner filtering media in said lower catalyst zone.

The invention also concerns a dual duct tubular system to form the inner wall of the recipient of a radial flow catalytic ammonia converter. Said tubular system comprises a plurality of gastight tube sections and filtering media, with each tube section having a face longitudinally contiguous to a convex filtering media designed to form a duct, with one of the ends of said filtering media being open and the other end being closed such that it is gastight. The filtering media does not extend along the entire length of the tube section. Its height is adjusted to the height of the corresponding catalyst bed. Preferably according to the invention, the base of each of said tube sections is fixed to a slot made in a flat, with the end of said filtering media located next to the base being obstructed by the solid part of said flat. Preferably, said flats are machined such that they can be fitted together, for example, on a support plate and assembled one after the other to form a circle around the periphery of said support plate. Two gastight connection devices are provided to connect up the tube sections.

The invention also concerns a manufacturing process for a radial flow catalytic ammonia converter, comprising a recipient with an outer shell, in which a tubular wall as defined previously is installed against the periphery of the inner wall of said shell, with said tubular wall being mounted by connecting up the tube sections of each tubular wall element, longitudinally (according to the longitudinal axis of the shell) and successively, such that they are gastight, catalyst zone by catalyst zone.

More particularly, the invention proposes a process to install the internal components of a recipient of a vertical radial flow catalytic ammonia converter, with the recipient comprising an outer shell. The process comprises stages according to which said shell is installed vertically after which an inner tubular wall is mounted in said shell, catalyst zone by catalyst zone, using the tubular system described above.

More particularly according to the invention, catalyst zone support plates having a hole in the centre are installed in the outer shell such that the central components of the converter can pass through, and comprising an opening (which can be opened and closed reversibly) to allow a human to enter (known as a manhole) located in the annular part between the inner tubular wall and the other filtering media called the inner filtering media. The part of the dual duct inner tubular wall corresponding to the lower catalyst zone is then installed by fixing the tube sections of said wall, each equipped with their respective filtering media, to the support plate of said catalyst zone, such that said sections of the catalyst zone are arranged on the periphery of said plate, the tube sections being placed vertically against the periphery of the inner wall of the outer shell, with the filtering media of the tubular wall facing the inside of the recipient. Installation of the inner tubular wall is continued by successively installing the tube sections each equipped with their filtering media in each catalyst zone, moving upwards to the top of the recipient, the tube sections from one catalyst zone to another is being connected using auxiliary connection devices to make them gastight. Preferably, such auxiliary connection devices also allow for vertical thermal expansion of the tube sections. Seal nipples are preferably used.

The tubular wall is therefore mounted from the lower catalyst zone up to the upper catalyst zone, directly inside the outer shell.

Advantageously according to said process, the catalyst particles are injected into each catalyst zone by passing through the manhole in the support plate of the catalyst zone above. Similarly, said particles are removed via the same manholes.

The invention will now be fully described in relation to its preferred characteristic features and their advantages, referring to FIGS. 1 to 12 in which:

FIG. 1 is a diagrammatic longitudinal section of a vertical ammonia converter according to the invention, comprising an inner tubular wall according to the invention.

The vertical converter comprises a cylindrical recipient equipped with an outer shell 1, catalyst beds, of which there are three in this example, upper LA, intermediate LB and lower LC, spaced vertically inside the recipient, in catalyst zones A, B and C. The catalyst particles in the catalyst beds are retained between filtering media in each catalyst zone as explained below.

Figure 1:
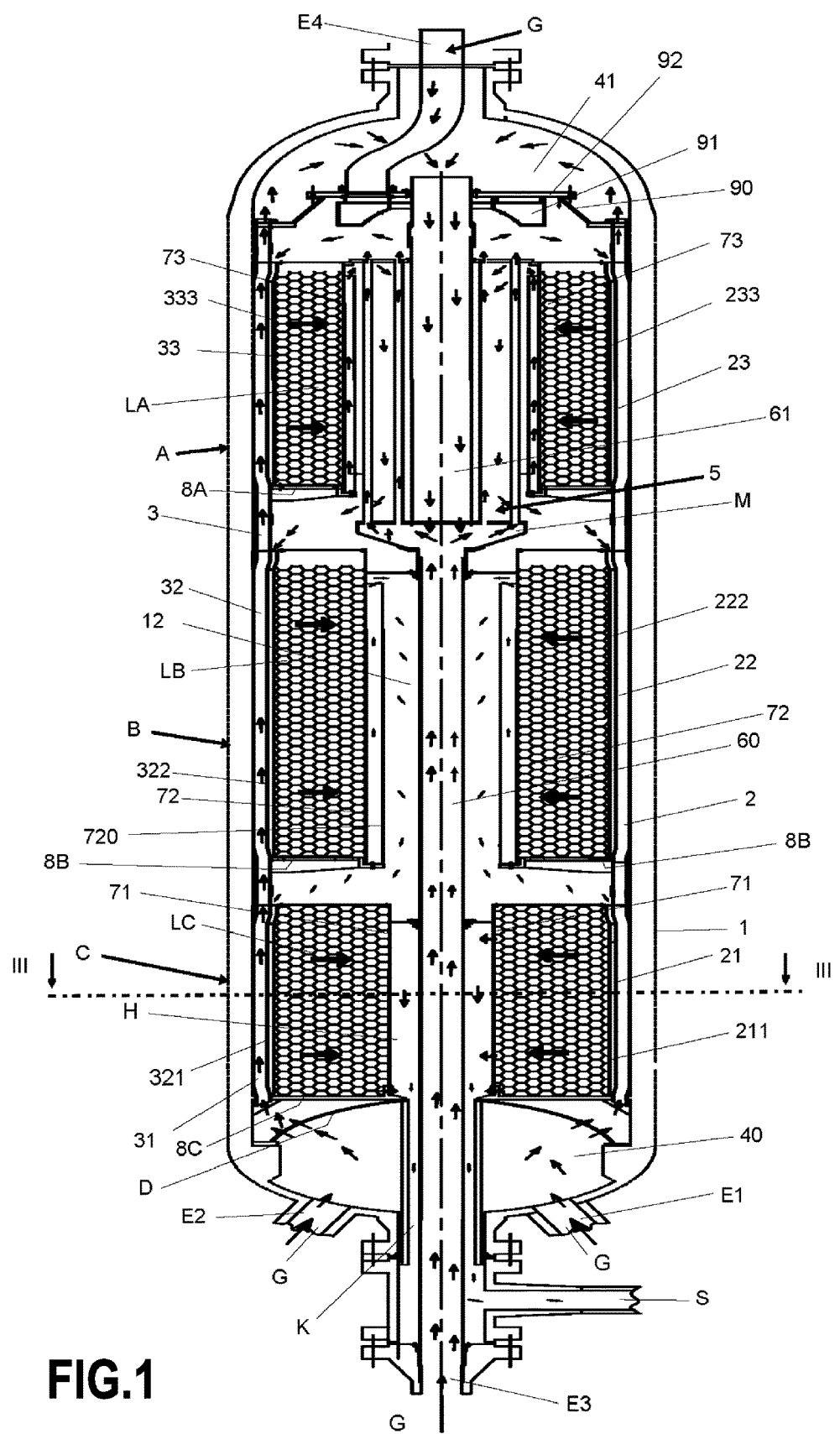
FIG. 1 is a diagrammatic longitudinal section of an ammonia converter including an inner tubular wall according to the invention.
Figure 2:
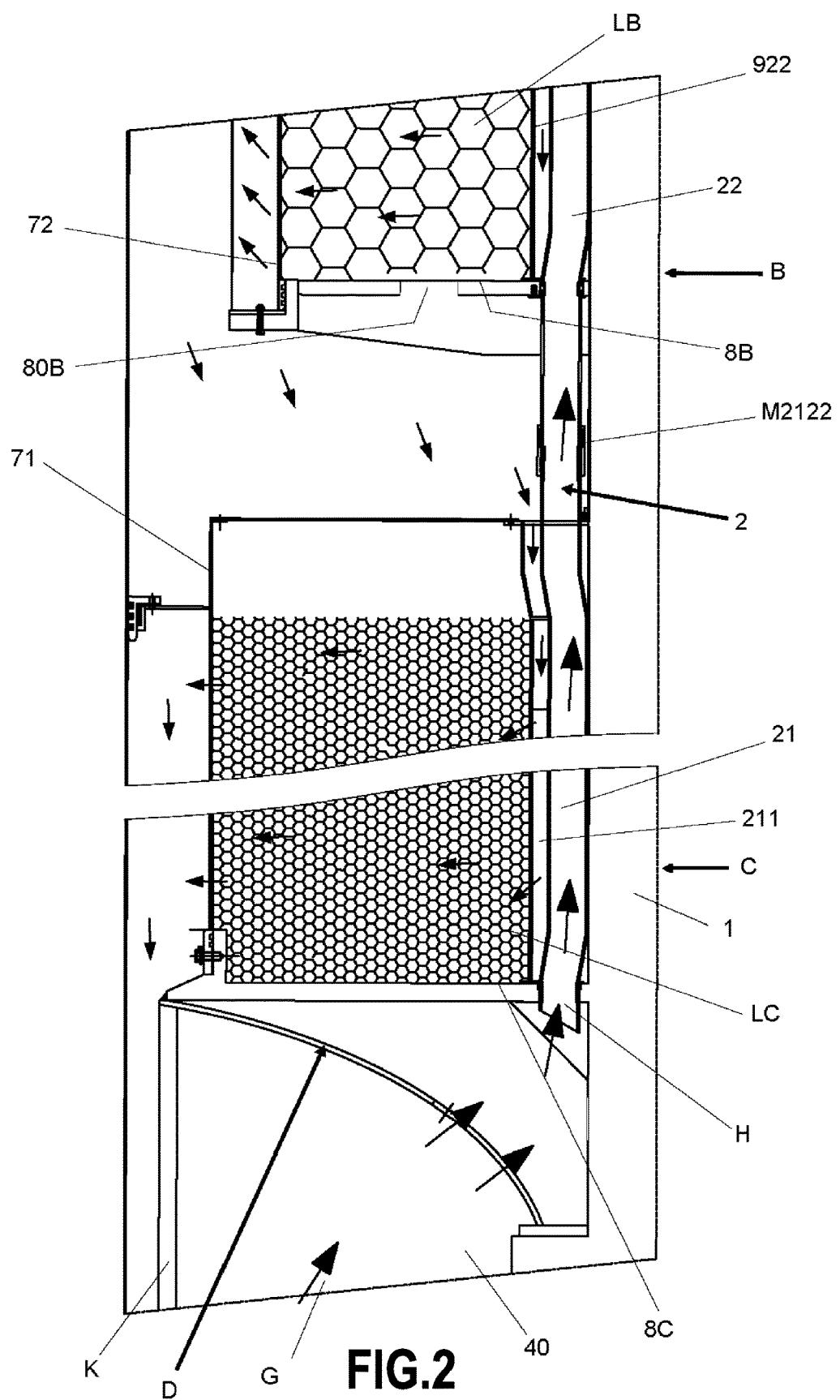
FIG. 2 is a partial enlarged diagrammatic view of FIG. 1.
Figure 3:
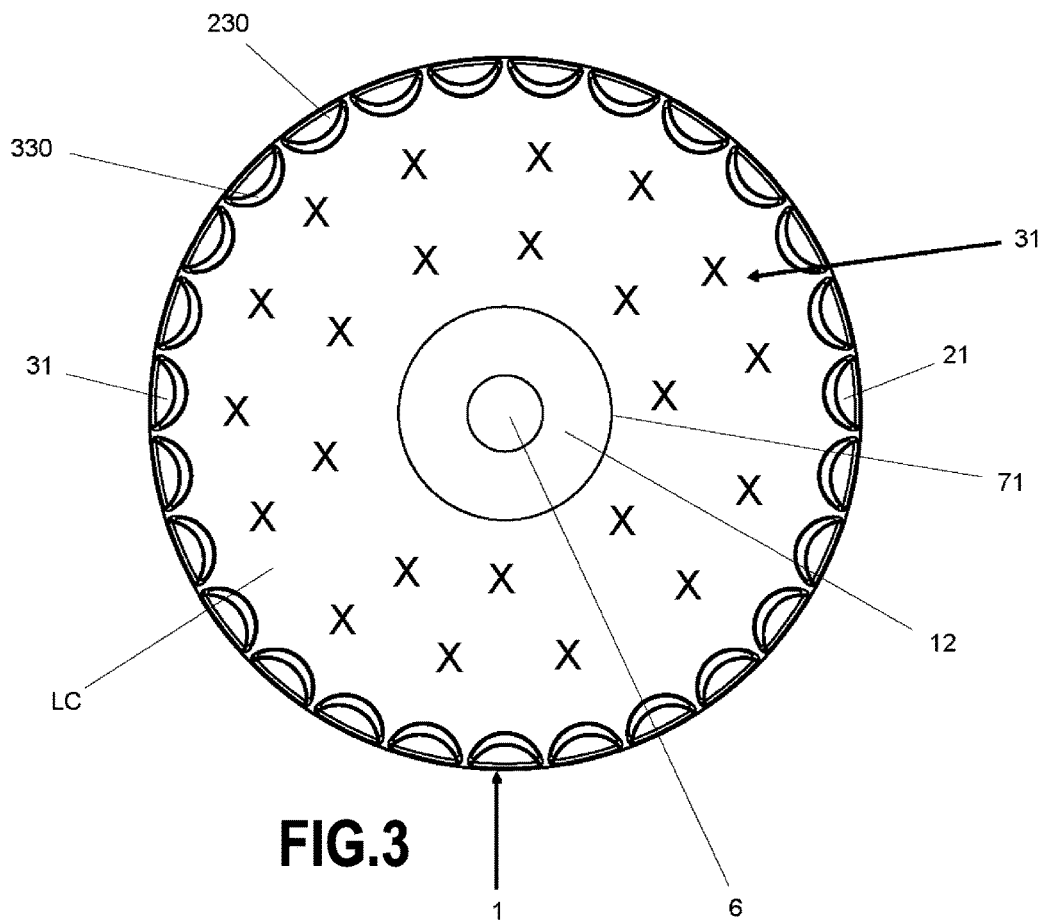
FIG. 3 is a diagrammatic cross-section in plane III-III of FIG. 1.

The converter recipient comprises an inner tubular wall consisting of several tubular elements placed equidistant from each other against the outer periphery of the inner wall of shell 1. As illustrated in FIG. 3 showing a cross-section of FIG. 1 in plane III-III in catalyst zone C, each tubular element comprises a tube equipped with filtering media. Each tube consists of tube sections as can be seen in FIGS. 1 and 2. Each tube, such as tube 2, seen in said figures, consists of tube sections 21, 22, 23 respectively of catalyst zones C, B, A, assembled one after the other, vertically, by joints made gastight by seal nipples M2122. Likewise, tube 3, seen on FIG. 1 consists of an assembly of tube sections 31, 32, 33.

The tubes forming the tubular wall are gastight and open at each end. The lower end of a tube leads into the lower part of the recipient, under lower catalyst bed LC, into injection chamber 40 of the gas mixture (nitrogen and hydrogen) to be converted while the upper end leads into gas distribution chamber 41 above upper catalyst bed LA. Said tubes enable the gas mixtures (nitrogen—hydrogen) injected into the bottom of the converter recipient to flow up to the top of the recipient, such that the effluents can be treated successively in the different catalyst beds according to a process known in itself used to convert a nitrogen-hydrogen mixture into ammonia.

The tubular element also has filtering media each of which, according to this example, is in the form of a strainer associated with a perforated plate to distribute the effluent, said strainer coming into contact with the catalyst particles in the catalyst bed, along the longitudinal outer face of said annular beds. The role of the strainers is to allow the gas to enter the catalyst bed and to retain the catalyst particles within the bed.

Furthermore, the catalyst particles are retained on the inner longitudinal face of the catalyst bed by another filtering media called the inner filtering media, which is cylindrical and centred around the central longitudinal axis (here, the vertical axis) of the converter recipient, and which, according to the example, is in the form of a single strainer associated with a perforated plate which enables distribution of the effluent inside the recipient to be controlled.

Figure 4:
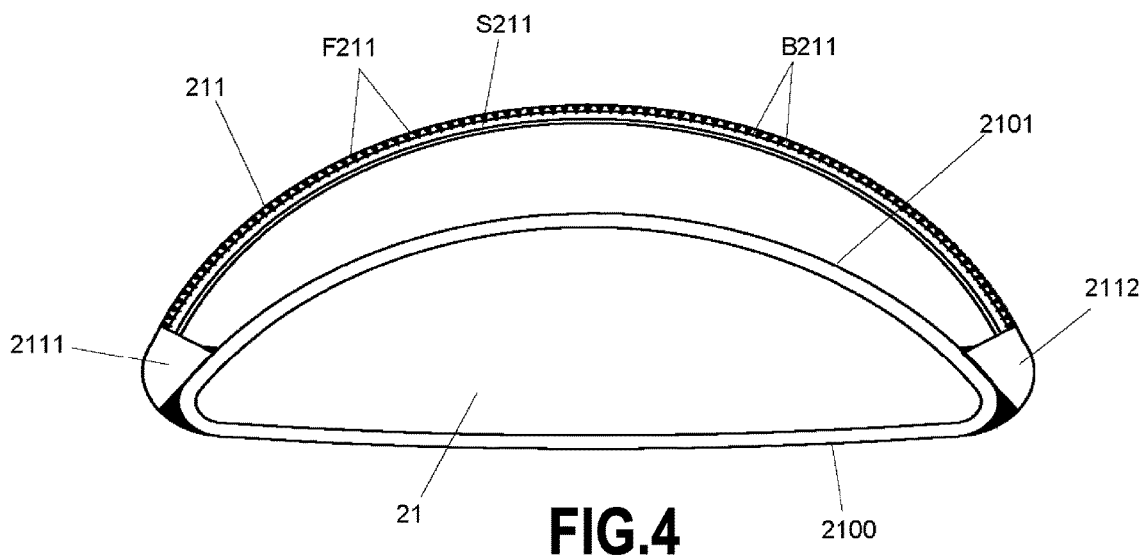
FIG. 4 is a diagrammatic cross-section of a tubular element of the inner tubular wall according to the invention.

FIG. 4 is a partial cross-section of a tubular element of the inner wall of the converter according to the invention, showing a tube section contiguous to a filtering media. According to this example, tube section 21 in the lower catalyst zone C, is semi-cylindrical in shape. Said tube section has a rear face 2100, which is in contact with the inner wall of shell 1, whose radius of curvature is substantially equal to that of the inner shell; and opposite a more convex front face 2101. A filtering media 211 which also has a convex face is contiguous to said convex face 2101. Said filtering media is in the form of a strainer associated with a perforated plate welded to longitudinal bars 2100, 2112. Said strainer typically comprises a plurality of wires F221, preferably V-shaped, placed parallel to each other and spaced transversely on support bars B211. Said bars B211 are curved to give the strainer a convex shape. The wires are preferably welded to the support bars at the tip of the V. The space between the wires is designed to obstruct the catalyst particles, which means it is smaller than the size of the catalyst particle in a given catalyst bed. The filtering media also comprises a perforated plate S211 which ensures homogeneous distribution of the gas effluent which passes through it.

Each of the tubular wall filtering media, such as the reference media 211 shown here, extends longitudinally over the height of the catalyst bed concerned.

Said media extends longitudinally over the tube section but not over its entire height. Its upper end is open to let in the gas arriving from above, while its lower end is obstructed so as to be gastight such that the gases cannot escape through said lower end and are thus forced to pass through the catalyst bed adjacent to the strainer.

According to the operating principle of an ammonia converter embodied according to the invention and of the vertical type shown in the figures, gas mixture G (nitrogen-hydrogen) injected in the lower part of the recipient, enters through several inlets E1 and E2 and flows into injection chamber 40, located in the lower part of the outer shell, equipped with a dome-shaped distributor D which supports the lower catalyst bed and ensures uniform distribution of said gas moving up through the tubes of the inner tubular wall, such as tubes 2 and 3 which can be seen in FIG. 1, to upper distribution chamber 41, after which it is directed towards a central duct 61 of the reactor to react with the catalyst in upper catalyst bed LA, after passing through a heat exchanger (tubular) and through filtering media 333 contiguous to tube section 33 of upper catalyst zone A.

According to the example, the gas to be converted is also injected through a central duct 60 via inlet E3 at the bottom of the recipient and combines with the gases moving downwards at heat exchanger 5.

The gas mixture is distributed radially through said catalyst bed LA to react with the catalyst, and leaves in the form of a gas flow which passes through cylindrical inner filtering media 73 of said upper catalyst bed LA. The gas effluent which leaves said upper catalyst bed LA partly contains ammonia. It then flows, once again, through heat exchanger tubes 5 towards a second intermediate catalyst zone B which is located above said upper zone A, passing through filtering media 322 contiguous to tube section 32 of zone A, so that, once again, the gas mixture reacts with the catalyst in the second catalyst bed LB by passing through it radially until it is distributed through another inner filtering media 72, which is cylindrical and centred on the central vertical axis of the recipient. The outgoing gas flow then passes through the central annular space 12 to be routed and treated in the same way through other catalyst beds, when they exist, until it reaches the last catalyst bed which is lower bed LC, once again through a filtering media 71 contiguous to tube section 31 of catalyst zone C considered, to pass through radially and react with said last catalyst bed The final outgoing gas flow, which comprises ammonia only, then flows axially into a duct K dedicated thereto until it reaches outlet S located in the lower part of the recipient. The ammonia will then be stored in liquid form or used directly.

Gas injection chamber 40 in the lower part of the outer shell comprises a dome D which distributes and ensures uniform distribution of the injected gas which flows upwards to the tubes of the tubular elements of the inner wall while supporting the mechanical stress exerted on support plate 8C of the lower catalyst bed, to which gas feed tubes H are welded and connected to said tubular elements. Outlet pipe K for the gas effluent flowing downwards to outlet S of the converter is fixed to the centre of the dome.

Gas distribution chamber 41, located in the upper part of the outer shell, comprises an upper cone 90 which is concentric to the central longitudinal axis of shell 1, providing a downward-flowing gas circulation area of reduced diameter, and thus reducing the diameter of flange 92 which closes the head that supports distributor 91 for the preheated gas to be treated which is inserted through upper inlet E4 and used to start the catalytic process.

As illustrated in FIG. 2, each circular support plate, such as plate 8B, supporting a catalyst zone, has a closable opening 80B, called a "manhole" in the industry, and is designed to enable a person to pass through. Said opening is located in the annulus between inner filtering media 71 and the tubular elements of the inner tubular wall of the catalyst zone considered. Said opening is, of course, closed, with a plate, for example, when the catalyst particles are present in the catalyst zone considered. The plate is removed to provide access to the catalyst zone from below to carry out installation and maintenance operations. Said "manholes" are used advantageously to install or remove the internal elements of the converter from the outer shell.

As the nitrogen-hydrogen gas mixture passes through the different catalyst beds, it is converted into ammonia gas according to a conversion process known in itself, based on the HABER basic process or other derivative processes. The catalysts used are also known in themselves.

Figure 5:
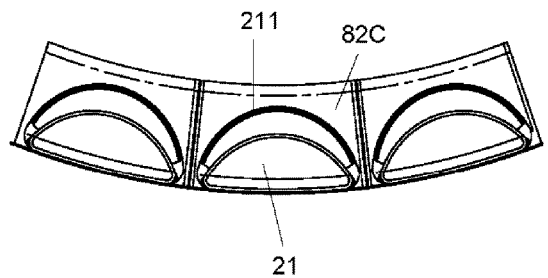
FIG. 5 is a partial bird's eye view of the tubular wall.

FIG. 5 gives a partial cross-sectional view (from above) of the inner tubular wall of the converter according to the invention. The tubular elements are arranged in a circle on the outer periphery. The base of each tube section 21, equipped with its filtering media 211, is welded to a slot in a flat 82C, such that the lower end of said filtering media is closed by the solid part of said flat. Each flat is mounted on the support plate of the corresponding catalyst zone. The flats are designed to fit together side by side to form a circle on the periphery of said plate. Preferably, a seal is placed between each flat.

Furthermore and preferably, the lower end of each tube section is bent slightly so that it is at a slight distance from the wall of the outer shell to facilitate the mounting of each tube by fitting its flat to the support plate of the catalyst bed considered.

Figure 10:
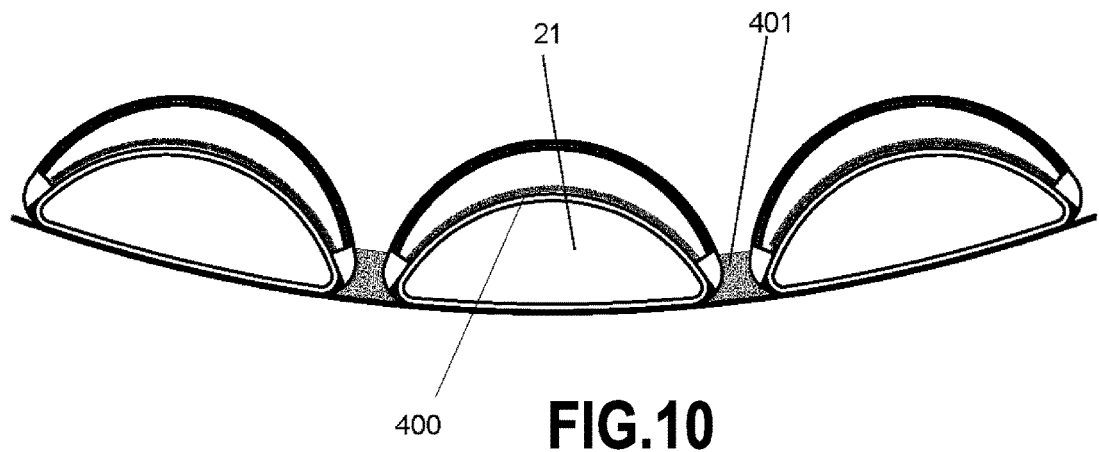
FIG. 10 is a partial diagrammatic cross-section of the tubular wall according to the invention equipped with thermal insulation.

For better control of the converter, a heat insulation layer is advantageously placed at the front of the tube sections of each tubular element such as the insulation layer 400 shown in FIG. 10 and/or an insulation area between each series of consecutive tubular element in the circle formed by their assembly, forming a heat insulation seal as shown by zone 401 in FIG. 10. In practice, each insulation seal is protected from direct contact with the particles in the catalyst bed. For this purpose, a metal sheet, not represented in FIG. 10, can be placed up against the surface of said insulation seal facing the catalyst bed. Said metal sheet is very thin such that it follows the exact shape of the seal and is perforated with perforations that prevent the catalyst particles from passing through said seal. Said metal sheet is, for example, fixed to the filtering media adjacent to said joint, by means of lugs, for example.

Figure 7:
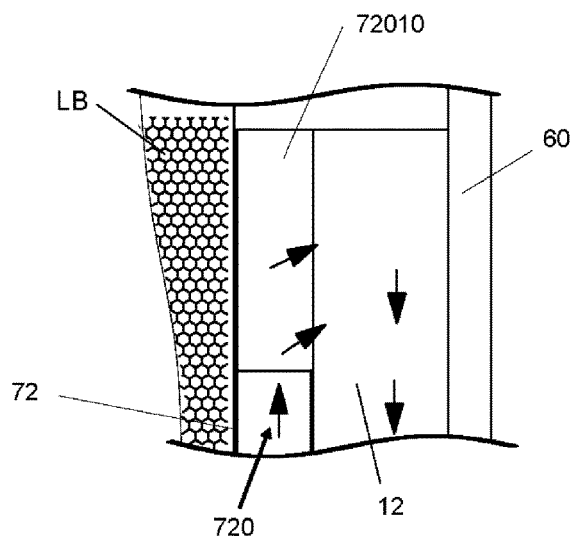
FIG. 7 is a diagrammatic longitudinal section of the inner filtering media associated with an inner gas effluent deflector made of fluted sheet illustrated in FIG. 6.
Figure 8:
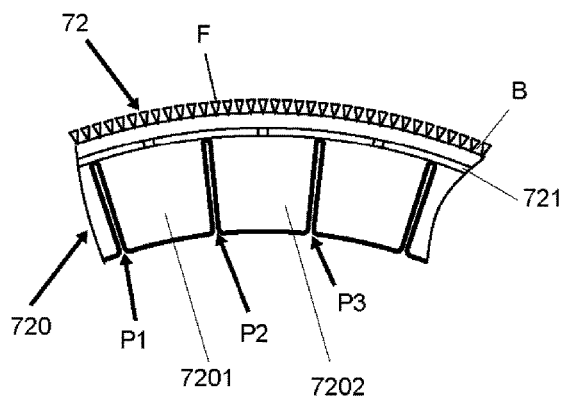
FIG. 8 is a diagrammatic cross-section of an inner filtering media associated with an inner gas effluent deflector made of fluted sheet illustrated in FIG. 6.
Figure 9:
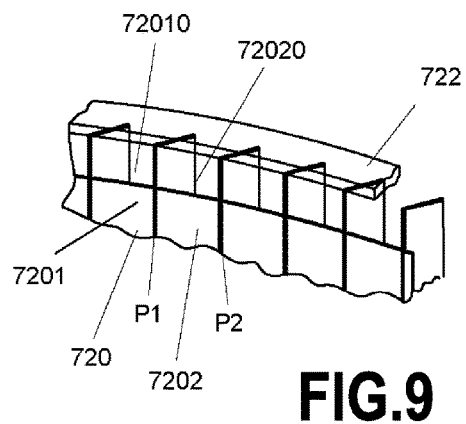
FIG. 9 is a partial diagrammatic bird's eye view of the inner filtering media associated with the deflector illustrated in FIGS. 6 to 8.
Figure 6:
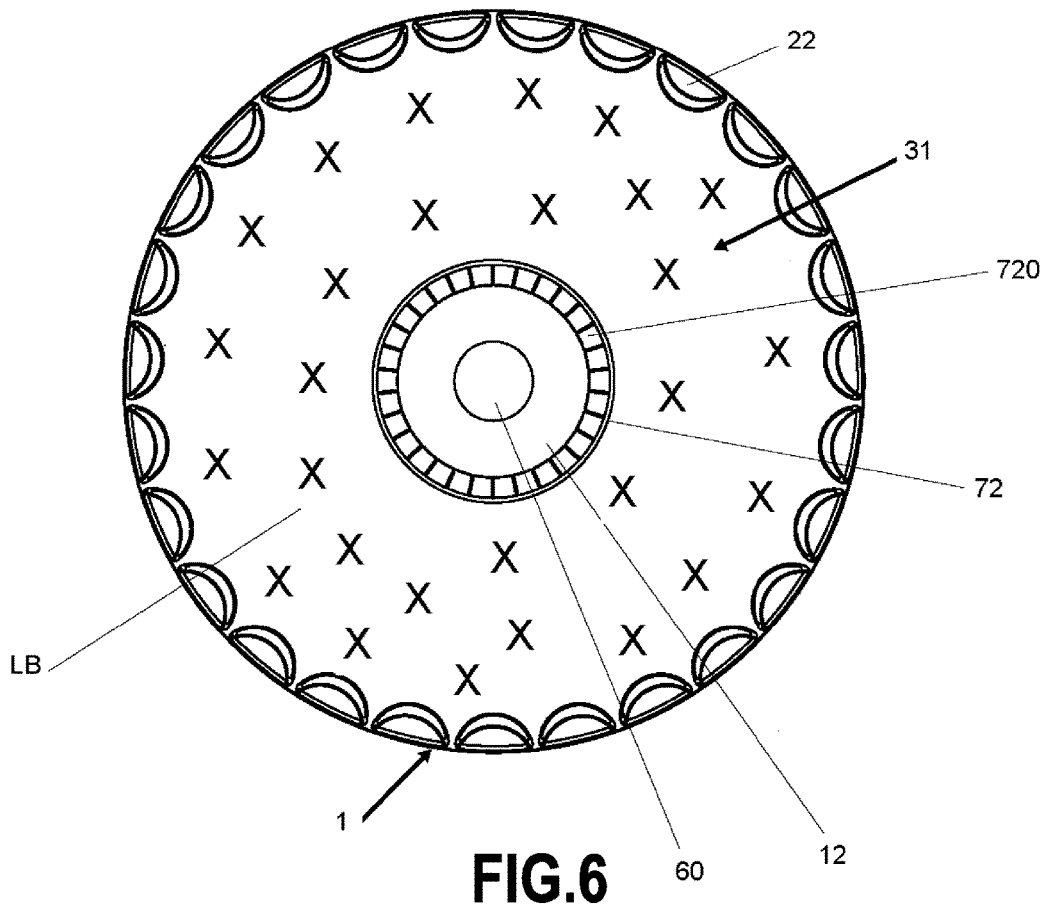
FIG. 6 is a diagrammatic cross-section of an ammonia converter including an inner wall according to the invention and an inner filtering media associated with an inner gas effluent deflector made of fluted sheet.

FIG. 6 is a partial cross-section in the transverse plane of the second catalyst bed of a converter according to the invention, as shown in FIG. 1, illustrating a converter equipped with an inner filtering media associated with a gas effluent metal deflector illustrated in FIGS. 7 to 8 and shown in FIG. 9. According to said figure, the cylindrical inner filtering media is associated with a cylindrical device 720 comprising a cylindrical fluted sheet having a closed configuration. Perforated plate 721 of said filtering media is placed between the perforated plate of the filtering media and said fluted sheet. Fluted sheet 720 is pleated, forming longitudinal grooves 7201, 7202, each delimited by two longitudinal folds, respectively (P1, P2) and (P2, P3), which form the longitudinal side walls of the groove. Each groove has a longitudinal front wall and all the grooves have the same vertical direction. The open part of the groove is in contact with perforated plate 721 located between the strainer and the fluted sheet. Fluted sheet 720 has holes cut in its upper part which each form an opening at the top of each groove such that the gas effluent which has passed through filtering media 72 as it leaves the catalyst bed considered (LB) can be directed upwards to the top of the grooves, leave via said openings and flow back down again through central annular space 12 towards the catalyst bed (LC) located below, the top and bottom ends of the inner filtering media and deflector assembly being obstructed.

The gas flow therefore passes into the longitudinal grooves of the deflector such as grooves 7201 and 7202 shown in FIGS. 8 and 9 in which it is routed upwards to openings 72010, 72020 as shown in FIGS. 7 and 9 at the top of the grooves. The gas effluent then passes into annular space 12 of the recipient (the space between the central pipe and said sheet steel support) before flowing back down to the lower catalyst bed, according to said example LC, passing through the filtering media contiguous to the corresponding tube section of the inner tubular wall of the converter recipient.

This type of fluted sheet gas effluent deflector associated with a cylindrical inner strainer is particularly advantageous as it is relatively light while being very resistant due to its fluted configuration. The perforated plate between the strainer and the fluted sheet is very thin. In accordance with the purpose of the invention, this type of deflector enables the amount of material needed for its manufacture to be reduced with respect to the prior art thus reducing the weight of the converter and subsequently its cost. It is much easier to handle.

The ammonia converter equipped with a tubular wall according to the invention is particularly light and thus less costly than a converter with an external vessel and internal cylinder. Furthermore, the fluted sheet gas effluent deflector associated with a cylindrical inner filtering media makes the converter even lighter while remaining sturdy.

To install the converter, particularly the internal components, usually called "internals" in the profession, said shell is first installed vertically, preferably on the operating site, after which the inner tubular wall is mounted in said shell, catalyst zone by catalyst zone.

According to a preferred embodiment of said example, support plates 8C, 8B, 8A of catalyst zones C, B, A are installed first in shell 1 (the support plates having a hole in the centre to allow the passage of the central components and comprising an opening that allows a human being to pass through). Lower chamber 40 with its perforated dome D and upper reducing piece 90, concentric with respect to the central longitudinal axis of the shell, have been installed previously. Support plate 8C of lower catalyst zone C partly rests on dome D.

Part of the dual duct inner tubular wall corresponding to lower catalyst zone C is then installed by arranging the tube sections of said wall, each equipped with their respective filtering media, and fixing each flat to which said tube sections are fixed, such that said sections of said catalyst zone are arranged in a circle on the outer periphery of the support plate of the catalyst zone. The tube sections are mounted vertically along the central longitudinal axis of the outer shell, covering the inner wall of the outer shell in the catalyst zone considered, with their filtering media facing towards the inside of the recipient.

The catalyst zone immediately above is then installed, in this example intermediate zone B, by mounting the part of the tubular wall corresponding to said zone as described for the lower zone. The connections between the sections of lower zone C and zone B immediately above are provided by auxiliary pipes placed between the ends of the sections, tightened by seal nipples according to a configuration that enables the joints the withstand the thermal expansion of the tube sections, particularly in the vertical direction.

The upper catalyst zone A is installed in the same way.

Distribution chamber 41 in the upper part of the shell is then installed, particularly annular distributor 91 and closing flange 92 at the head of the shell.

Figure 11:
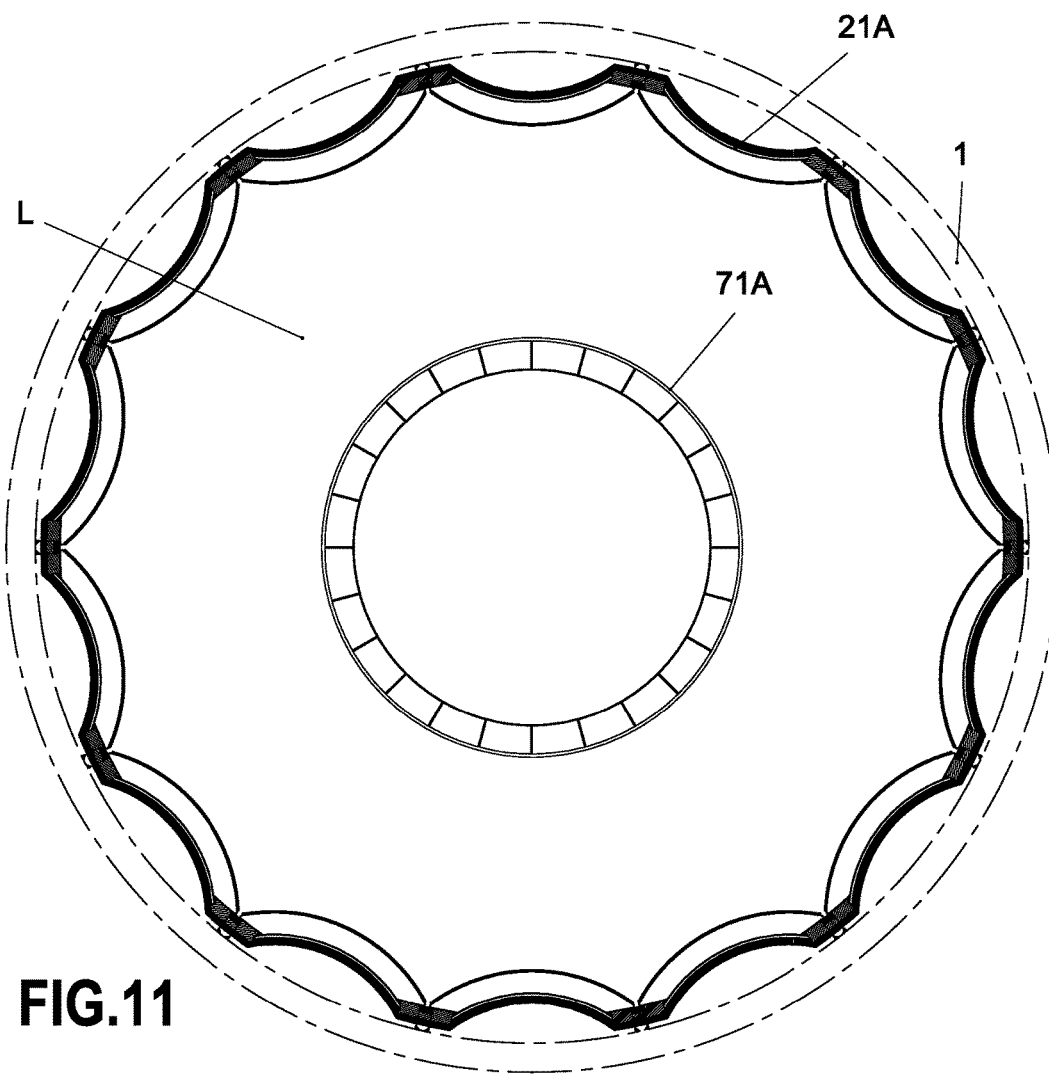
FIG. 11 is a diagrammatic longitudinal section of an ammonia converter including an inner tubular wall according to a variant of the invention.
Figure 12:
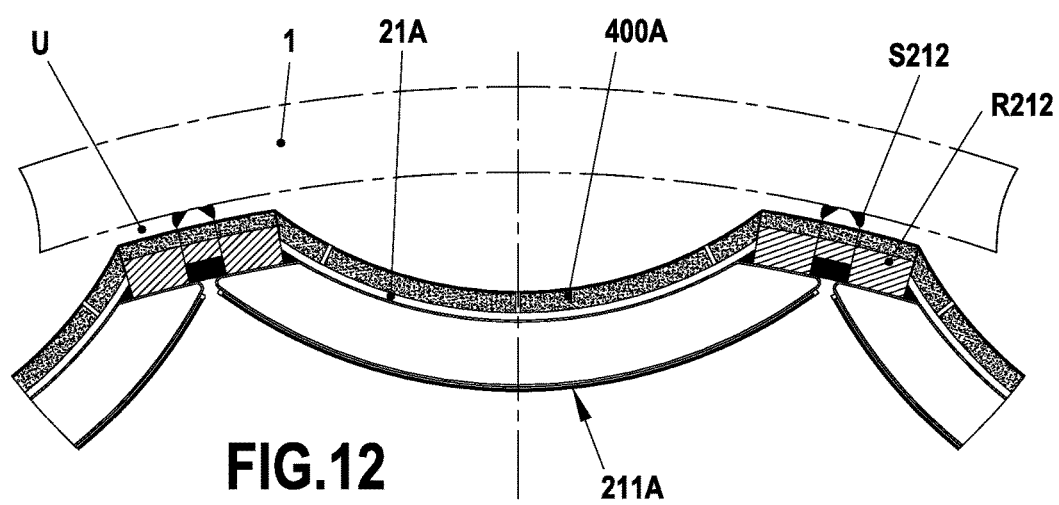
FIG. 12 is a partial diagrammatic cross-section of the tubular wall in FIG. 11, said wall being equipped with thermal insulation.

In a specific embodiment of the invention, as shown in the cross-section of a catalytic stage of a converter in FIGS. 11 and 12, the tubular elements comprising the inner wall of the converter can be in the form of tubes consisting of tube sections open longitudinally on the inner wall side of shell 1 of the converter, their respective gastight walls facing towards a catalyst bed considered L and equipped on their surface, on the catalyst bed side as described above, with a filtering media 211A to prevent the catalyst particles from passing through said wall is preferably convex. The converter according to the example also comprises and inner filtering media 71A at each given catalyst stage similar to those described previously in relation to FIGS. 1 to 10.

A tube comprises tube sections assembled end-to-end vertically for a vertical converter.

As illustrated in FIG. 11, for a given catalyst stage, the tubular wall comprises tube sections open longitudinally 21A, assembled side-by-side to form a circle by means of longitudinal members arranged longitudinally between two adjacent tube sections. FIG. 12 roughly illustrates the side-by-side assembly of the tube sections. Each longitudinal edge of the wall of a tube section 21A, that is, the closest edge of the longitudinal member considered, is welded to a longitudinal member R212, and likewise, the edge of the wall of the other adjacent section is welded to the other side of the longitudinal member. The longitudinal member is preferably in the form of a bar of rectangular or square section.

Preferably in said specific embodiment, each longitudinal member is supported by a support coupled transversely with the inner wall of the converter shell, in particular according to a male-female type gastight fitting. For example, the longitudinal member support comprises a plurality of relatively short transverse bars S212, regularly spaced and welded to the inner wall of shell 1 of the converter. The longitudinal member has openings corresponding to the shape and dimensions of said bars, arranged accordingly, such that said bars fit into said slots respectively. The fittings are made gastight by welding, for example, and/or seals. The longitudinal member support bars are advantageously designed so that they are a little longer than the corresponding slots such that said bars project slightly beyond the slot on the inner wall side of the converter shell. A small U-shaped space is thus created between the inner wall of the shell and the longitudinal member which remains free to allow circulation of the upward-moving gas routed by said longitudinally open tubes of the tubular wall.

Preferably, the walls of the tube sections are equipped with thermal insulation devices 400A, on the side opposite the inner wall of the converter shell.

As mentioned immediately above, the converter according to the invention using the tubular system described is particularly advantageous to manufacture because the internal components of said converter are mounted on the operating site in the outer shell after it has been positioned. This avoids having to transport the internals already mounted in an internal cylinder to the operating site and having to lift a very great weight as was the case for prior art converters.

Moreover, the tubular wall thus designed enables the spent catalyst to be easily removed from the reactor, or for repairs to be carried out, without complex, difficult operations being required. Manholes can easily be made in each catalyst zone to pass from one zone to another.

It is nevertheless clear from the above that the invention is not limited to the embodiments specifically described and illustrated in the figures and that it extends, on the contrary, to any variant achieved by equivalent means.

The invention applies to ammonia converters comprising a single catalyst bed or several catalyst beds. It applies to a vertical converter, but a similar tubular wall can be adapted to a horizontal converter. Whatever the case, the tubular elements comprising the converter are arranged on the periphery of the outer shell, longitudinally according to the central longitudinal axis of said shell.

The invention claimed is:

1. Vertical ammonia converter with radial flow catalyst beds, comprising a recipient consisting of an outer shell equipped with a dual duct inner tubular wall to route effluents in upward and downward directions, said tubular wall being made of a multitude of vertical tubular elements arranged in a circle on an outer periphery of an inner wall of said outer shell, said tubular elements being made of tubes with gastight walls, open at top and bottom ends to route an effluent to be treated in the upward direction from an injection chamber located in a lower part of said outer shell to a distribution chamber located in an upper part of said outer shell, which tubes are contiguous to a filtering media over a height of a catalyst bed, said filtering media being open at an upper end to allow passage of a downward-flowing effluent and closed at a lower end to route and distribute said effluent through their effluent-permeable face towards the catalyst bed retained on an outer face by said filtering media.

2. Vertical ammonia converter according to claim 1, wherein said recipient is equipped with a vertical outer shell of circular section and a plurality of catalyst zones with annular catalyst beds fixed and spaced vertically in said shell, including an upper catalyst zone and a lower catalyst zone, and each catalyst zone also comprising an inner filtering media arranged concentrically around the longitudinal central axis of said recipient to extend over the height of the catalyst bed of said zone, said recipient being equipped with an inner tubular wall comprising a plurality of vertical tubular elements arranged in a circle on the entire outer periphery of the inner wall of said outer shell, said elements each consisting of a tube and filtering media, each tube comprising a series of tube sections with gastight walls, assembled vertically to each other such that they are gastight, to form a tube that is open at the top and bottom ends, the bottom end arriving below the lower catalyst zone and the top end arriving above the upper catalyst zone, each tube section having a front side facing towards the inside of the recipient, to which said filtering media is longitudinally contiguous, extending over the height of the catalyst bed of a given catalyst zone, the lower end of said filtering media being closed such that it is gastight and the upper end of said filtering media being open.

3. Converter according to claim 2, wherein said catalyst bed support plate comprises a closable opening provided between the tubular elements and said inner filtering media, which is large enough for a person to pass through.

4. Converter according to claim 2, wherein said inner filtering media of a given catalyst bed is associated with a deflector for an effluent leaving said media in the form of a fluted sheet with longitudinal grooves, having a closed configuration, arranged on the outer periphery of said inner filtering media, an effluent-distribution perforated plate comprising said inner filtering media being inserted between a screen of said inner filtering media and said fluted sheet, the upper and lower ends of the assembly formed by said inner filtering media and the fluted sheet being made gastight such that said longitudinal grooves, each delimited by two consecutive folds of the wall of said fluted sheet, form ducts that direct the outgoing effluent up to the top of the catalyst zone, openings being provided at the top of each longitudinal groove only to allow the effluent towards to flow into an annular space of the recipient.

5. Vertical ammonia converter according to claim 2, wherein the upper zone has a central tubular heat exchanger.

6. Converter according to claim 1, wherein a side facing the inner wall of the outer shell of each tube of tubular elements, in particular of each tube section, has a radius of curvature substantially equal to that of the inner wall of the outer shell and that their front side is convex in the direction of the inside of the recipient.

7. Converter according to claim 1, wherein said filtering media contiguous to the tubes of the tubular elements each has a convex shape whose convexity is turned towards the corresponding catalyst bed.

8. Converter according to claim 1, wherein each catalyst bed is supported by a circular plate.

9. Converter according to claim 8, wherein an outer edge of said circular plate is fixed to the inner wall of the outer shell of the recipient.

10. Converter according to claim 1, wherein the tube sections of the tubular elements of said tubular wall, equipped with their respective filtering media and dedicated to a given catalyst zone, are each fixed at their base to a slot in a flat, the lower end of said filtering media being obstructed by the solid part of said flat.

11. Converter according to claim 10, wherein said flats supporting the tube sections equipped with their filtering media, in a given catalyst zone, are arranged on the outer periphery of the support plate of said zone.

12. Converter according to claim 1, wherein the injection chamber located in the lower part of the outer shell has a perforated dome to allow for homogeneous distribution of the injected fluid and help to support the catalyst zone above it.

13. Converter according to claim 1, wherein the distribution chamber located in the upper part of the outer shell comprises an upper concentric cone with respect to the central longitudinal axis of the shell, supporting a head closing flange.

14. Converter according to claim 13, wherein the head closing flange supports a fluid distributor at the head of the recipient.

15. Vertical ammonia converter according to claim 1, in which said tubes have a longitudinal opening on the inner wall side of the outer shell of the converter.

16. Converter according to claim 15, in which the tubular wall of a catalytic stage comprises a plurality of tube sections with a longitudinal opening on the inner wall side of the outer shell of the converter, said tube sections being assembled one next to the other to form a circle by connecting up side beams arranged between two adjacent sections, said side beams being connected to the inner wall of the outer periphery such that a space is left between said inner wall of the outer shell and the side beams for the circulation of effluents routed upwards by the tubular wall.

17. Converter according to claim 16, in which said side beams are coupled to said inner wall of the shell on transverse supports fitted together such that they are gastight, in slots made in said side beams, each support protruding through the slot in which it is fitted together, in its welded part of said inner wall to create said effluent circulation space.

18. Installation process for the internal components of a recipient of an ammonia converter comprising radial flow catalyst zones, the recipient comprising an outer shell, according to which said outer shell is installed vertically, after which an inner tubular wall is installed in said shell, catalyst zone by catalyst zone, using a tubular system, wherein the tubular system is a dual duct tubular system comprising a plurality of tube sections with gastight walls and filtering media, with each tube section having a side contiguous to a convex-shaped filtering media to form a duct, one end of said filtering media being open, and the other being closed and gastight, with the base of each of said tube sections being fixed to a slot in a flat, with the end of said filtering media in said base being obstructed by the solid part of said flat, each flat being designed such that it is mounted on the outer periphery of a catalyst bed support plate, the installation process comprising:

in the outer shell, catalyst zone support plates are installed, with a hole in the centre to allow central components to pass through, and comprising a closable opening that is sufficiently large for a person to pass through, a part of the dual duct inner tubular wall corresponding to the lower catalyst zone is installed by fixing the tube sections of said wall, each equipped with their respective filtering media, to form a circle on the outer periphery of the catalyst zone support plate, the tube sections being installed vertically against the inner wall of the outer shell, the filtering media facing the inside of the recipient, and the installation of the inner tubular wall is continued by successively installing the tube sections of each catalyst zone in the same way, moving up to the top of the recipient, the tube sections from one catalyst zone to the next being connected such that they are gastight using auxiliary connection devices.

\* \* \* \* \*